E. BLANCHARD.
Combined Garden-Hoes and Rollers.
No. 137,124.   Patented March 25, 1873.
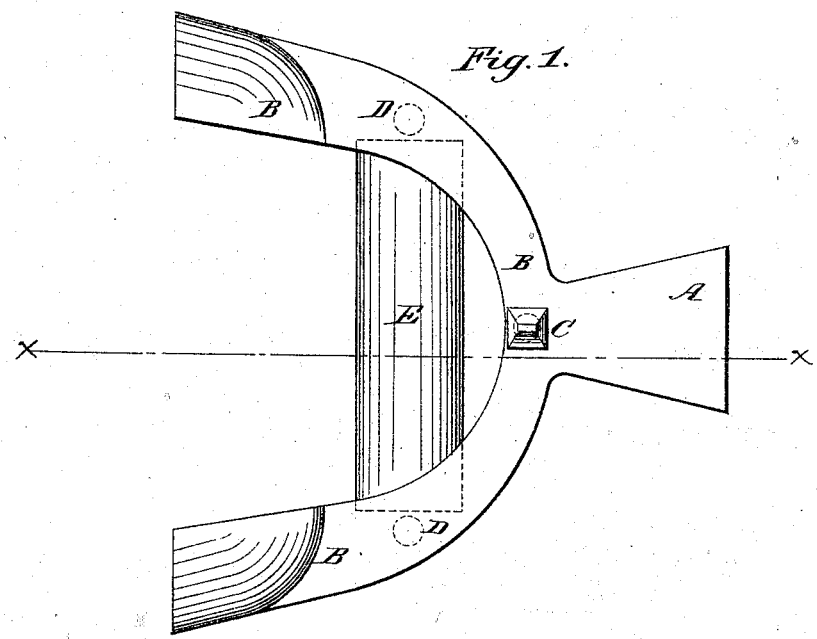
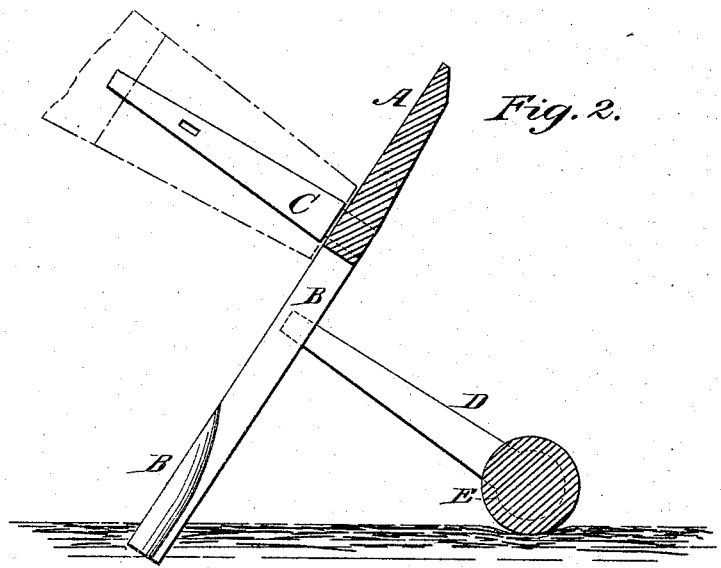
Witnesses.
P. H. Dieterich
C. Sedgwick
Inventor.
E. Blanchard
per Munn &co.
Attorneys.

UNITED STATES PATENT OFFICE.

EDMOND BLANCHARD, OF POOLESVILLE, MARYLAND.

IMPROVEMENT IN COMBINED GARDEN HOES AND ROLLERS.

Specification forming part of Letters Patent No. 137,124, dated March 25, 1873.

*To all whom it may concern:*

Be it known that I, EDMOND BLANCHARD, of Poolesville, in the county of Montgomery and State of Maryland, have invented a new and useful Improvement in Garden Implement, of which the following is a specification:

Figure 1 is a front view of my improved tool. Fig. 2 is a detail section of the same taken through the line $x\ x$, Fig. 1.

Similar letters of reference indicate corresponding parts.

My invention has for its object to furnish an improved tool designed for gardeners' use, which shall be so constructed that it may be used for opening a furrow to receive the seed, covering the seed, and rolling the soil down upon it, and which shall at the same time be simple in construction and convenient in use; the invention consists in a garden implement formed of the hoe, the curved and beveled or twisted plate, the shank or eye for the handle, the arms, and the roller, constructed and arranged in connection with each other, as hereinafter fully described.

A is the hoe or part of the tool designed for opening the furrow, trench, or drill to receive the seed, and which is formed upon the arch or bend of the part B, which is made U-shaped, and the ends of its arms are twisted or inclined to give them the proper form for drawing in the soil from the sides of the trench or furrow to cover the seeds. To the parts A B, at their point of intersection, is attached a shank, C, or in them is formed an eye to receive the handle. To the arms of the part B, at a proper distance from their ends, are rigidly attached two short rearwardly-projecting arms, D, to the outer ends of which are pivoted the ends of the roller E, which, when the arms B are being used for covering the seed, follows in the rear of said arms and presses down the soil upon the seed.

Having thus described my invention, I claim as new and desire to secure by Letters Patent—

A garden implement formed of the hoe A, curved and beveled or twisted plate B, shank or eye C, arms D, and roller E, constructed and arranged in connection with each other, substantially as herein shown and described, and for the purpose set forth.

EDMOND BLANCHARD.

Witnesses:
 JOHN T. NORRIS,
 ISAAC FYFFE.